United States Patent [19]

Rademacher et al.

[11] Patent Number: 4,797,760
[45] Date of Patent: Jan. 10, 1989

[54] CASSETTE DECK WITH COMBINATION TAPE PULL-OUT & TENSIONING LEVERS

[75] Inventors: Karl-Heinz Rademacher, Alsbach; Theo Wolf, Rossdorf, both of Fed. Rep. of Germany

[73] Assignee: Robert Bosch GmbH, Stuttgart, Fed. Rep. of Germany

[21] Appl. No.: 79,820

[22] Filed: Jul. 30, 1987

[30] Foreign Application Priority Data

Aug. 8, 1986 [DE] Fed. Rep. of Germany ....... 3626940

[51] Int. Cl.$^4$ .................... G11B 5/008; G11B 15/00; G11B 17/00
[52] U.S. Cl. ......................................... 360/95; 360/85
[58] Field of Search ............... 360/85, 93, 84, 71, 360/74.3; 242/75.4–75.44

[56] References Cited

U.S. PATENT DOCUMENTS

| 4,425,590 | 1/1984 | Johnstone et al. ............ 360/85 |
| 4,500,817 | 2/1985 | Kudelski ........................ 242/75.44 |
| 4,636,887 | 1/1987 | Kato et al. . |

FOREIGN PATENT DOCUMENTS 0066352 12/1982 European Pat. Off. ............. 360/71

Primary Examiner—Stuart N. Hecker
Assistant Examiner—David J. Severin

Attorney, Agent, or Firm—Frishauf, Holtz, Goodman & Woodward

[57] ABSTRACT

To provide for controlled tape tension during pull-out of tape (11) from a cassette into a preliminary pulled-out position, placement of the tape in a transducing path (11a) and subsequent operation of the tape in the transducing path, two tape loading elements (21,22) are movably located on a support (65a) to engage behind the tape (11) in the cassette (12) and move the tape out of the cassette and towards the transducing path. The tape loading elements, for example in form of hooked levers (FIG. 3), are driven by a motor, to move the tape loading elements from a rest position into a position where the tape is out of the cassette and, later, placed in said transducing path. The same tape loading elements are resiliently deflectable with respect to a surrounding sleeve (64) which is axially driven by the motor (60), relative deflection of the sleeve (64) and of the respective tape loading element (21,22) being sensed by an angle sensor (90,91,91a) to provide a relative deflection output signal which, in turn, is connected to the drive motors for the tape reels to control, respectively, tape tension, torque and direction of rotation of the tape drive motors, forming dynamo electric elements, for constant tape tension during either tape pull-out, tape loading, or tape operation conditions.

6 Claims, 4 Drawing Sheets

CASSETTE DECK WITH COMBINATION TAPE PULL-OUT & TENSIONING LEVERS Reference to related patent, the disclosure of which is hereby incorporated by reference:
U.S. Pat. Nos. 4,379,313, Tsuchiya; 4,636,887, Kato et al; 3,673,348.

Reference to related publication:
European Patent application publication No. 0 133 822, Shiratori.

Reference to related applications, assigned to the assignee of the present application, the disclosure of which is hereby incorporated by reference:
U.S. Ser. No. 079,829, filed July 30, 1987, Rademacher claiming German priority P 36 26 939,
U.S. Ser. No. 079,819, filed July 30, 1987, Rademacher claiming German priority P 36 26 941,
U.S. Ser. No. 079,832, filed July 30, 1987, Rademacher claiming German priority P 36 26 942.

The present invention relates to magnetic tape transducer apparatus and more particularly to tape recorder/reproducer apparatus suitable for recording of television images in digital form.

BACKGROUND

Video cassette recorders usually are so arranged that a magnetic tape is held within a cartridge or cassette and being passed in front of transducing heads, also known as magnetic transducer heads, for scanning of magnetic data encoded or recorded on the magnetic tape. In one type of system, which is widely used, spiral scanning is employed, in which the magnetic tape is passed in a spiral path over a usually cylindircal scanning arrangement. The tape passes thereover in the form of a helix and is scanned by magnetic heads which rotate at high speed in a ring-shaped slot of the scanning head. The tape moves with slow speed in a linear direction—that is, linearly with respect to the tape—as it is being scanned at high speed by the rapidly rotating heads. Such video magnetic tape apparatus is frequently used with tape retained in magnetic tape cassettes, in short, in cassettes or cartridges. Structures are provided for pulling the tape out of the cassette after it has been introduced into the housing of a scanning apparatus. The tape, as it is being pulled out of the cassette, is then placed by suitable guide elements into a scanning path, in which it is contacted by further drive and guide apparatus. Magnetic tape is sensitive with respect to tension and must not be overstressed; on the other hand, the tape should fit snugly about the guide elements and other structures in the tape path, that is, should not have any free or drooping loops or the like, or loose or slack zones, since, then, the correct position of the magnetic tape in its path is not always ensured when the tape is operating, that is, is being scanned.

U.S. Pat. No. 4,636,887, Kato et al., (claiming priority of a Japanese application 19 22 59 - 82, filed Nov. 1, 1982) describes a tape loading arrangement for a recording/reproducing apparatus in which the tape withdrawal process is subdivided into a plurality of partial withdrawal steps. The first two such steps are carried out without controlling tape tension at all. It has been found that, during the uncontrolled pull-out of tape, no definite or controlled longitudinal tension can be applied on the tape and, therefore, sagging or loose loops of tape may form. Transition from uncontrolled pull-out to controlled pull-out steps at later partial operating steps require careful control to prevent impacts or sudden jars. To prevent such jarring, a comparatively, complex arrangement utilizing a plurality of sensors is suggested which, in dependence on the instantaneous position of the tape, control drive motors for the loading apparatus and for the tape reel disks or tables. They also control mechanical brakes, sequentially, to thereby control the final operating position and condition of the tape. A microprocessor is used to control the respective steps.

U.S. Pat. No. 3,673,348 describes a tape recorder apparatus with a tape loading arrangement in which a tape length compensating lever is used, acting and operative at the initiation of the band pull-out step. The apparatus uses a tensioning lever which is part of the structure of the cassette which, however, does not have any tape control function. Thus, no arrangements are provided in which the tape loading, or return process can be influenced to also control the length and tension of tape being pulled out from a cassette when the lever reaches one or the other of its terminal positions in its operating movement.

THE INVENTION

It is an object to provide a tape handling apparatus for use in conjunction with tape transducing apparatus, for withdrawal and subsequent operating control of the tape, which is simple, inexpensive to manufacture and easily adaptable to various types of tapes, tape cassettes and cartridges.

Briefly, a tape loading element, preferably in the form of an angled or curved lever, is movably located on a support forming part of the tape handling apparatus, and external of the cassette. When located in a rest position, it can engage behind the tape, while still in the cassette, and move the tape out of the cassette into a tape transducing path. The tape loading element, or lever, is moved from the rest position to pull the tape out by a controlled electric motor. The position of the tape loading element is sensed during operation of the apparatus, including the time of transducing, and while the tape loading element, i.e., the lever is engaged by the moving tape. A tape tension control system is provided, and the tape loading element, that is, the lever, forms part of the tape tension control system so that the lever can continue to control the tape during operation. The position of the lever, which is spring-loaded, is sensed by positioning pick-ups and, in dependence on whether the tape is too slack, or too tight, more or less braking, or driving torque are applied to dynamo electric drive motors which pull the tape in its operating path and provide, if so controlled, a braking; or restraining torque, respectively. Since the tape may operate in two respectively reverse directions, the motors, preferably are bi-directional, so that either motor may function as a pulling, driving dynamo electric element or as a dynamic brake.

The arrangement has the advantage that the tape length compensation lever, which is combined with the pull-out lever, can control the tape tension in all operating modes to an essentially constant value. It is effective also during pull-out of the tape from the cassette. The further advantage of the system is the independence of the control function of the tape length compensating lever from the instantaneous tape position during the tape removal or extension as well as tape returning operations.

In accordance with a preferred feature of the invention, increase of tape tension upon loading tape into a transducing apparatus, and drop-off of tape tension upon unloading of tape can be controlled continuously, without transition between uncontrolled and controlled movement, so that no sudden jars or peak loads will be applied to the tape. The control system is simple and does not require skilled and expensive adjustment and calibration.

DRAWINGS

DETAILED DESCRIPTION

Figure 1:
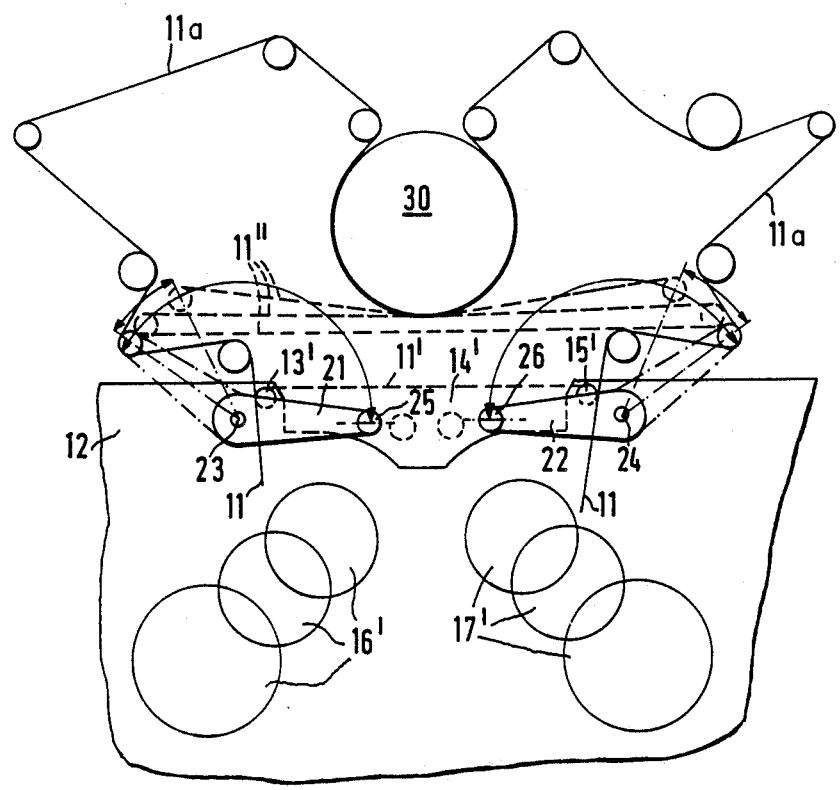
FIG. 1 shows, highly schematically, the tape path of a magnetic tape transducer apparatus, constructed in accordance with the present invention.

Magnetic tape 11—see FIG. 1—is retained within a cassette 12, shown only in schematic fragmentary form, and which may be of any suitable construction. When the tape is not used, the tape 11 is guided from a tape supply reel, e.g., one of the reels 16', over a tape guide element 13' formed within the cassette. Along the open front side 14' of the cassette, and towards a second internal cassette guide element 15', and then to the respective second tape reel, that is, any one of the reels 17' which may then form the take-up reel. The band supply reels, shown schematically at R1,R2 in FIG. 4, may have different sizes, located in cassettes of different sizes. The position of respective differently dimensioned reels are shown, schematically, by respective superimposed circle 16',17' in FIG. 1, in which the circle 16' forms one tape supply reel and the circle 17' another. Depending on the direction of movement of the tape, either one of the reels R1,R2 (FIG. 4) or the respective ones of the reel pairs of the reels shown schematically in FIG. 1 at 16',17' will be the pay-out and take-up reels.

Upon insertion of a cassette 12 into the cassette well of the apparatus, two levers 21,22 engage through an opening 14' in the cassette from below and behind the tape 11, shown at position 11' where it passes across the opening 14' of the cassette The lever 21 is rotatable about an axis 23; lever 22 can rotate about axis 24. At the free end, lever 21 has a tape guide element 25, which may be a roller, guide post or the like. Lever 22 has a similar tape guide element 26, typically a roller. To pull out the tape, levers 21,22 are rotated in opposite directions, as will be explained in detail below with reference to FIG. 2, about their axes of rotation 23,24. Lever 21 is rotated counter-clockwise, lever 22 clockwise. In their end positions, levers 21,22 can position the magnetic tape in various planes, in dependence on the then instantaneous position of the respective levers, as shown by the broken lines 11''. This is an intermediate position; additional tape guide and deflection elements, shown only schematically since they do not form part of the present invention, can then pull the tape about the scanning head 30, as shown by the tape path 11a in FIG. 1.

In accordance with a feature of the invention, tape tension continues to be controlled during the second positioning phase of the magnetic tape, continuously, to predetermined values, as will be described below. The levers 21,22 thus, have dual function:

(1) To remove the tape from the path 11' to the path 11'' from the cassette to a path outside of the cassette 12; and (2) Control the magnetic tape by electrically controlling the tape reel drive motors M1,M2 (FIG. 4) while, simultaneously, compensating for tape length being removed.

Figure 2:
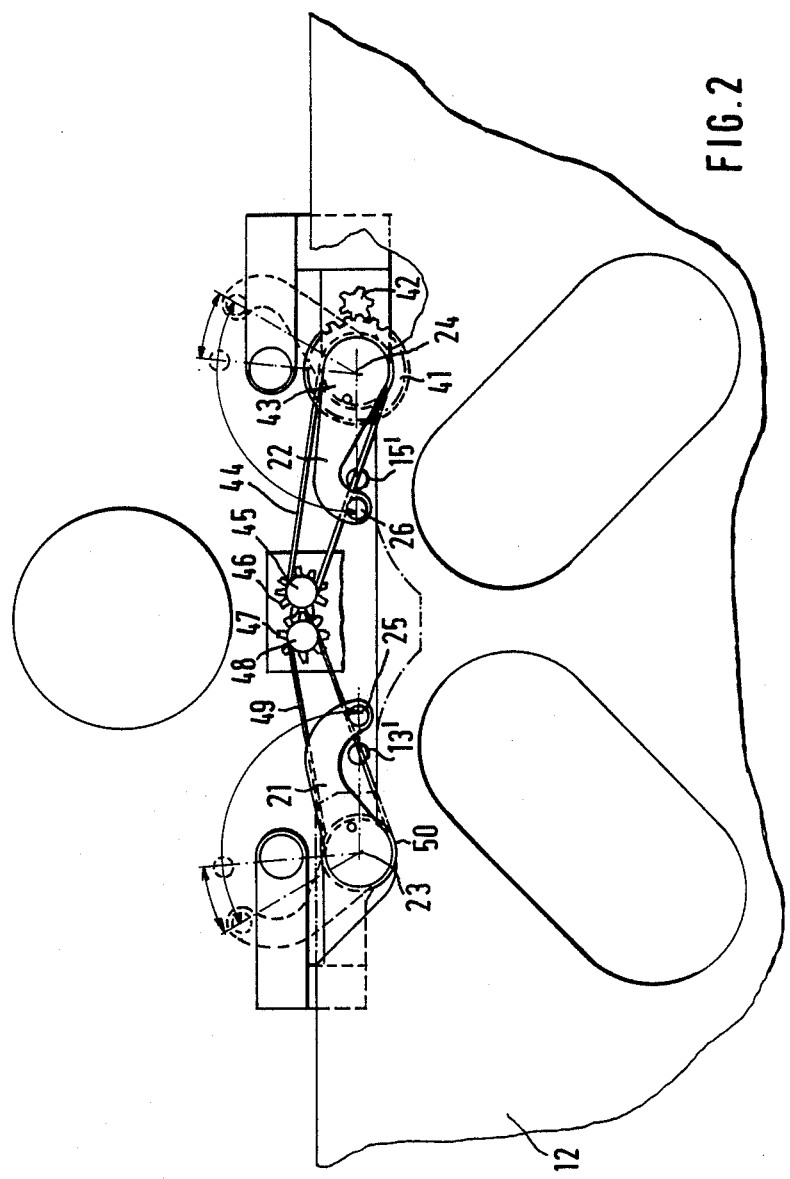
FIG. 2 is a fragmentary showing of the tape pull-out mechanism, and schematically illustrating movement of a tape length compensating as well as pull-out roller combination.

FIG. 2 illustrates the removal apparatus in greater detail. The levers 21,22 are angled, or bent levers, of generally, hook shape; they are shown in FIG. 1 straight, only for general illustration. The hook shape of the levers 21,22 permits fitting the levers around the tape guide elements 13',15'. The rotating movement of the levers 21,22 is not based on a fixed coupling with a rigid shaft; rather, the terminal position of the levers 21,22 will depend on the then-pertaining tape tension. The pivoting movement of levers 21,22, thus, does not extend to a remote position up to a fixed stop, but, rather, to an end region or range, as will be described below.

Figure 4:
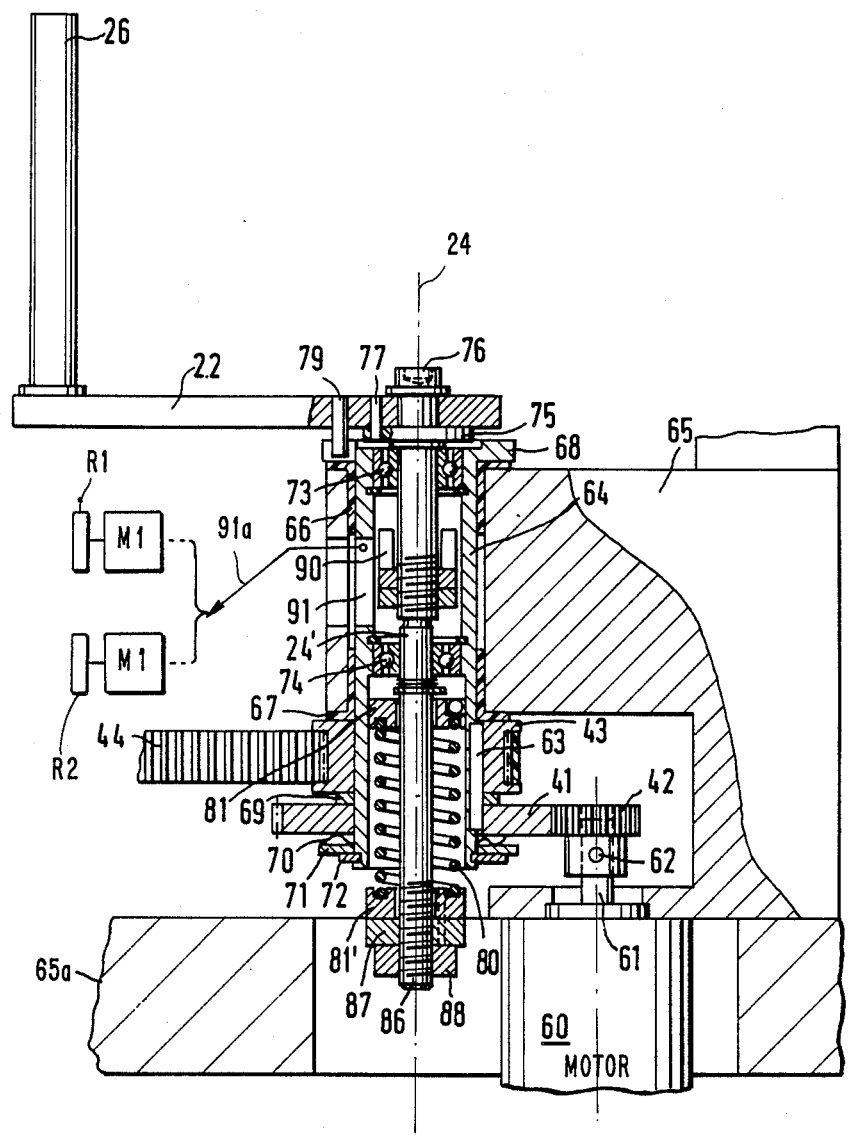
FIG. 4 is a vertical part cross-sectional view of the combined tape pull-out and length compensating lever and the sensing and control apparatus, controlled by the position of this lever.

The rotary movement for the levers 21,22 is synchronous, assuming similar loading conditions. The two rotary drives are 15 coupled together. Pivoting movement of lever 22 about the axis 24, formed by a shaft, is caused by a gear 41, concentric with the axis 24, which is in engagement with a pinion 42, coupled to a drive motor 60 (FIG. 4). The motor 60 has been omitted from FIG. 2 for clarity of illustration. A sprocket wheel 43 is secured to the gear 41; sprocket wheel 43 is coupled by a gear belt 44 to a sprocket 45 which is coupled to a gear 46. Gear 46 is in engagement with a gear 47 which, in turn, is coupled to a further sprocket 48. A second gear belt 49 is driven by the sprocket 48 which, in turn, drives a sprocket 50, located on a shaft having the axis of rotation 23, and coupled to the lever 21, to rotate the lever. Upon rotation of drive motor 60, and hence of the pinion 42, and assuming equal loading, the two levers 21,22 will move in opposite directions and synchronously.

FIGS. 3A and 3B show the levers in detail, in which FIG. 3A illustrates the basic, or rest position, and FIG. 3B shows the lever at its terminal end position, that is, if it would not be loaded by engagement with the tape. During the movement of the lever 22 from the position of FIG. 3A to the position of FIG. 3B, the free end of the lever with the tape guide element, typically roller 26 may, however, resiliently move back through the angle and, in such movement, control the motors M1,M2 (FIG. 4) via sensors coupled to the lever to control the tension of the tape being wrapped or guided by the roller 26. The maximum pivoting movement for roller 22, which, of course, will also be the maximum excursion for the lever 21, is shown by the angle $\beta$ in FIG. 3A, FIG. 3B.

The construction of the support of the respective rollers 21,22, which are identical and mirror symmetrical with respect to each other, is best shown in FIG. 4. Only the retention arrangement for lever 22 will be described since that for lever 21 can be mirror symmetrical with respect thereto.

FIG. 4 illustrates respective elements previously described in greater detail; the same reference numerals have been used. Drive motor 60 has a shaft 61 on which pinion 42 is secured by a cross pin 62. Pinion 42 is in engagement with gear 41, located concentrically with shaft 24', which is concentric with axis 24. Gear 41 is secured to the sprocket 43, so that it cannot rotate with respect thereto, by a connecting spring 63. A sleeve 64 is retained in a bearing block 65, secured to a frame element 65a of the apparatus. Sleeve 64 is journalled in the bearing block by a slide bearing element 66,67, acting both radially as well as axially. The axial position of the bearing is defined by a flange 68 of the sleeve 64, located at the end of a sleeve 64 opposite that on which the sprocket 43 is secured. The sprocket wheel 43 is tensioned against the slide bearing 66 by a spacer washer 69, the gear 41, an undulating spring ring 70, a washer 71 and a holding C clamp ring 72. The undulating spring ring 70 permits the sleeve 64 to rotate in the bearing block 65. Rotation of the sprocket 63 is transmitted by the gear belt 44 as described in connection with FIG. 2 to the lever 21.

The axis 24, forming also the axis of rotation of the shaft 24', is concentric with respect to the axis of rotation of the sleeve 64. Shaft 24 is rotatably journalled by two ball or roller bearings 73,74. Shaft 24' has a flange 75 for engagement by the lever 22. Lever 22 carries the tape guide roller 26 at its far end. A central attachment element 76 connects the lever 22 with the shaft 24', and a pin 77, passing through two aligned bores in the lever 22 and the flange 75 of the shaft 24' secures the relative angular position of the lever 22 with respect to the shaft 24'.

Figure 3:
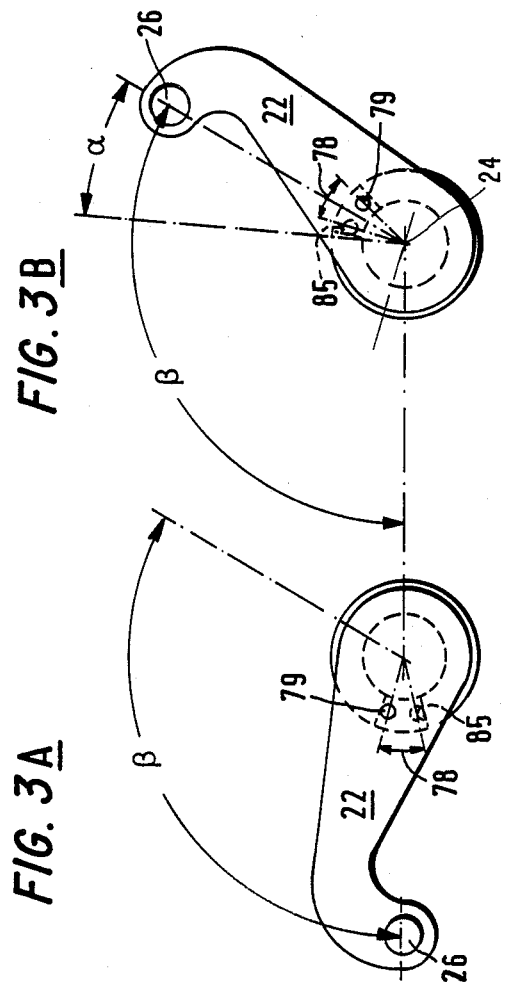
FIG. 3A is an enlarged representation of movement of the pull-out lever in one mode of operation.
FIG. 3B is a diagram similar to FIG. 3A, illustrating another operating mode.

In accordance with a feature of the invention, the lever 22 is formed with a recess or opening 78 in a flange portion, concentric with the axis 24—see FIG. 3. An engagement pin 79, secured in the flange 68 of the sleeve 74, permits angular deflection of the lever 22 by an angle defined by the length of the lever is securely connected to an engagement element 81 on the sleeve 64 with one end; another end of the spiral spring 80 is connected with the shaft 24' by being connected to an adjustably located counter element 81', which is secured to the shaft 24'. The spring 80, thus, permits biasing the lever 22 in such a direction that, when in unloaded condition, it always engages with the flank 85 (FIG. 3) against the pin 79. The counter bearing 81' (FIG. 4) is coupled to rotate with the shaft 24' by being screwed on a threaded end 86 of the shaft 24' and retained on the shaft 24' by a nut 87 which is secured by counter nut 88 against undesired relative rotation.

In accordance with a feature of the invention, a sensor system formed by a window 91 in the sleeve 64 and including a sensing arrangement 90 carried by the shaft 24 and cooperating with a detector—not shown for clarity—and fixed in position on the sleeve 24, permits sensing the relative rotary position of the shaft 24' at any rotary position of the sleeve 64; the relative rotary position of the sleeve 64 with respect to the shaft 24 and hence of the lever 22, thus, can be sensed. The sensor combination 90—window 91—and sensor on the sleeve 64 may be of any suitable and well-known construction, for example and preferably be non-contacting; optical or magnetic sensing elements to determine relative rotation of two concentric rotary elements are well known.

Sensing signals from the sensing combination 90,91 are transmitted via a line schematically shown at 91a to the respective motors M1,M2, coupled to the reels R1,R2, that is, with reference to FIG. 1, to reels 16',17', respectively.

OPERATION

Upon introduction of the cassette 12 into the apparatus (see FIG. 1), the presence of a cassette is sensed, either automatically, or by a suitable sensing arrangement, for example by interrupting a light path. Alternatively, manual control of introduction of a cassette can be initiated, for example by operating a suitable "load cassette" command button. When the cassette is in operative condition, as sensed by a suitable sensor, or by a snap-engagement catch, drive motor 60 (FIG. 4) is energized, rotating shaft 61 to initiate the tape loading procedure. The shaft 61 rotates in counter-clockwise direction, driving pinion 42 which rotates in clockwise direction, turning sleeve 64 in clockwise direction, to rotate the lever 22 about the axis 24 and hence move the tape guide roller 26 in the direction shown by the angle arrow $\beta$, FIG. 3. So long as tape tension is below a predetermined threshold, the level of which is determined by the spring constant of the spring 80, lever 22 will move along with the sleeve 64 and move the tape into the desired poition. Simultaneously, movement is transferred to the lever 21, as described in connection with FIG. 2, which is driven in mirror image direction.

Let it be assumed that, during tape withdrawal and tape loading, a greater than normal resistance to tape pull-out will result; this may be caused, for example, by tape reels in the cassette 20 which do not rotate freely. Magnetic tape 11 then will place a counter directed force on the tape guide roller 26 and hence against the lever 22. The lever 22 will retard with respect to the sleeve 64, counter the bias force exerted by the spring 80. Relative movement between the lever 22 and the sleeve 64 will be sensed by the sensing system 90,91,91, resulting in an output signal on line 91a. This change in relative position is electrically evaluated, as well known, to control the motors M1,M2, respectively, to provide additional drive energy to the pull-out motor, for example motor M1 (FIG. 4) which pulls out tape from a supply reel to a take-up reel; if the supply motor is dynamically braked, braking torque can be reduced. Control of such an arrangement can be in accordance with well-known control and servo technology. If the pay-out reel is driven in pay-out direction, the torque of the drive motor, likewise, can be increased to overcome the resistance of the tape reel, which does not turn freely, so that the magnetic tape can be pulled out easily from the cassette 12, without excessive stress being placed thereon.

The lever 22, movable relative to the sleeve 64 will, in normal operation and in actual practice, place itself in an average center position within the opening 78, as shown in FIG. 3B, by the center position of the line connecting the axis 24 with the center line of roller 26, see the dimension also indicated at 78. Under usual tape operating conditions, the lever 26 will be approximately in the center between the angle indicated at $\alpha$ in FIG. 3B, which angle corresponds about to the distance shown at 78 in FIG. 3B. Changes in tape tension will be compensated for by increased supply of drive energy to the drive pay-out motor, or braking torque applied thereto, or drive energy to the pull-on or take-up motor. Since the lever 21 can move on its sleeve 64 independently of the movement of the lever 22 about the opening 78, similar individual control is available for the other one of the reels, by similar respective movement of the lever 21 and its sleeve 64.

During normal operation of the tape recorder, the levers 21,22 will remain in operation, so that the tape will be controlled to proper tension by the very same levers which also cause pull-out of the tape, thereby protecting the tape against excessive stresses placed thereon, both during the pull-out movement as well as in normal operation. The tape levers, additionally, continue to control tension of the tape during further pull-out movement to place the tape in the path shown at 11a, FIG. 1. Thus, the levers 21,22 control tape tension during initial pull-out, subsequent placement in the operating path, and during final operation of the tape upon rotation of the scanning head 30.

Various changes and modifications may be made within the scope of the innventive concept.

We claim:

1. Magnetic tape transducing apparatus with automatic tape withdrawal, to withdraw tape (11) from a cassette (12), having
    support means (65a) for supporting the cassette (12);
    dynamo electric means (M1,M2) for, respectively, driving a cassette reel (R1,R2) for supplying tape and taking up tape, and providing tensioning torque, to maintain tape tensioned at a predetermined level;
    tape tension control means (21, 22; 90,91,91a) coupled to the tape and to the dynamo electric means and controlling the dynamo electric means to maintain a predetermined tape tension,
    said apparatus comprising, in accordance with the invention,
    tape loading elements (21, 22) located on the support means and movable from a rest position for engagement behind the tape (11) in the cassette and to move the tape out of the cassette towards a transducing path (11', 11", 11a);
    means (60) for moving the tape loading elements from the rest position to move said tape toward the transducing path; and
    means (90,91,91a) sensing the position of the tape loading elements during operation of the apparatus when said tape loading elements are engaged by the tape,
    said tape loading elements (21, 22) and said position sensing means (90,91,91a) forming part of the tape tension control means, controlling the dynamo electric means during removal of tape from the cassette, placing the tape in the transducing path, and controlling tape tension during tape operation when in said transducing path.

2. The apparatus of claim 1, wherein said tape loading elements control said dynamo electric means in dependence on tape tension, torque, and direction of rotation of the respective dynamo electric means to maintain tape tension at an essentially constant level.

3. Magnetic tape transducing apparatus with automatic tape withdrawal, to withdraw tape (11) from a cassette (12) having support means (65a) for supporting the cassette (12);
    dynamo electric means (M1,M2) for, respectively, driving a cassette reel (R1,R2) for supplying tape and taking up tape, and providing tensioning torque, to maintain tape tensioned at a predetermined level;
    tape tension control means (21, 22; 90,91,91a) coupled to the tape and to the dyanmo electric means and controlling the dynamo electric means to maintain a predetermined tape tension,
    said apparatus comprising, in accordance with the invention,
    tape loading elements (21, 22) located on the support means and movable from a rest position for engagement behind the tape (11) in the cassette and to move the tape out of the cassette towards a transducing path (11, 11", 11a);
    means (60) for moving the tape loading elements from the rest position to move said tape toward the transducing path; and
    means (90,91,91a) sensing the position of the tape loading elements during operation of the apparatus when said tape loading elements are engaged by the tape,
    said tape loading elements (21, 22) and said position sensing means (90,91,91a) forming part of the tape tension control means, controlling the dynamo electric means during removal of tape from the cassette, placing the tape in the transducing path, and controlling tape tension during tape operation when in said transducing path,
    wherein said tape loading elements (21, 22) comprise single arm levers rotatable about an axis of rotation (23, 24) located at one portion of said lever and having, at another portion of said lever, tape guide means (25,26) coupled thereto;
    a rotation transmitting element (64) coupled to said means (60) for moving the tape loading elements;
    resilient coupling means (80) coupling said rotation transmitting element (64) to the tape loading elements (21,22), while permitting relative deflection of said tape loading elements and the rotation transmitting element;
    and wherein said position sensing means are responsive to said relative rotation of the rotation transmitting element and the resilient coupling means.

4. The apparatus of claim 3, wherein the resilient coupling means permit relative rotation of the tape loading element with respect to the tape rotation transmitting element (64) in a direction counter the direction of rotation of the rotation transmitting element when said means (60) for moving the tape loading elements move said tape loading elements in tape loading direction.

5. The apparatus of claim 3, wherein said tape loading elements (21,22) are securely coupled to a shaft (24);
    and said rotation transmitting element comprises a tubular element (64) surrounding said shaft, and coupled to said means (60) for moving the tape loading elements;
    and a spring (80) coupling said shaft (24') and said tubular element (64) together, said sensing means sensing relative angular deflection of said shaft (24') with respect to said tubular element (64).

6. The apparatus of claim 5, wherein said spring is a spiral spring surrounding said shaft;
    and said sensing means includes a window (60) formed in said tubular element surrounding the shaft, and a positioned element (90) on said shaft, and signal means (91a) coupled to the tubular element and providing a signal representative of the relative angular position of the shaft with respect to the tubular element at any angular position of the tubular element with respect to said support means (65a).

* * * * *